United States Patent
Melton (10) Patent No.: US 7,926,746 B2
(45) Date of Patent: Apr. 19, 2011

(54) PRESSURE REGULATING VALVE GASKET

(75) Inventor: Michael Thomas Melton, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 159 days.

(21) Appl. No.: 11/322,754

(22) Filed: Dec. 30, 2005

(65) Prior Publication Data

US 2007/0152085 A1 Jul. 5, 2007

(51) Int. Cl.
  *B05B 1/30* (2006.01)
(52) U.S. Cl. ........ 239/583; 239/205; 239/203; 239/204; 239/206
(58) Field of Classification Search ............... 239/79, 239/433, 85, 203, 204, 205, 206, 583, 237; 137/532, 533.27, 533.29, 543.15, 543.23
See application file for complete search history.

(56) References Cited

U.S. PATENT DOCUMENTS

| | | | | |
|---|---|---|---|---|
| 1,013,093 A | * | 12/1911 | Reeve | 137/514 |
| 1,828,697 A | * | 10/1931 | Yardley | 137/543.13 |
| 1,860,004 A | * | 5/1932 | Yardley | 137/543.13 |
| 1,875,145 A | * | 8/1932 | Ralston | 137/414 |
| 1,970,126 A | | 8/1934 | Buckner | |
| 2,679,858 A | | 6/1954 | Kemp | |
| 3,408,006 A | * | 10/1968 | Stanwood | 239/66 |
| 3,943,969 A | * | 3/1976 | Rubin et al. | 137/538 |
| 4,276,901 A | * | 7/1981 | Lyons | 137/469 |
| 4,340,080 A | * | 7/1982 | Lefrancois | 137/223 |
| 5,301,919 A | * | 4/1994 | May | 251/30.02 |
| 5,482,080 A | * | 1/1996 | Bergmann | 137/549 |
| 5,899,386 A | * | 5/1999 | Miyasato et al. | 239/289 |
| 5,927,607 A | * | 7/1999 | Scott | 239/205 |
| 6,186,413 B1 | * | 2/2001 | Lawson | 239/205 |
| 6,478,237 B2 | * | 11/2002 | Kearby et al. | 239/232 |
| 6,543,476 B2 | * | 4/2003 | Kazaoka | 137/538 |
| 2003/0111549 A1 | * | 6/2003 | McNulty et al. | 239/203 |

* cited by examiner

*Primary Examiner* — Len Tran
*Assistant Examiner* — Trevor E McGraw
(74) *Attorney, Agent, or Firm* — Fitch, Even, Tabin & Flannery (57) ABSTRACT

An irrigation sprinkler is provided with a housing configured for a fluid flow therethrough. A pressure regulating device having a gasket configured to variably move between a first position to a second position is disposed within the housing. The pressure regulating device includes an outlet with a variable opening formed from the cooperation of fluid passages in the gasket with a portion of the valve bore.

8 Claims, 7 Drawing Sheets

PRESSURE REGULATING VALVE GASKET

FIELD OF THE INVENTION

The invention relates to an irrigation sprinkler pressure regulating device and, in particular, to a gasket for the pressure regulating device.

BACKGROUND OF THE INVENTION

It is common for an irrigation sprinkler to include a pressure regulating device, such as a valve, in order to regulate a downstream fluid pressure in the sprinkler housing or case prior to the outlet nozzle. Maintaining a consistent fluid pressure at the nozzle outlet ensures optimum performance and efficiency of the fluid stream or spray. An undesired decrease in fluid pressure below a predetermined range often forms a fluid stream or spray with less energy, which may be susceptible to wind effects. On the other hand, an undesired increase in fluid pressure above a predetermined range may result in misting, fogging, or unwanted fluid trajectories.

For example, a gear-driven rotor often includes a pressure regulating valve within an inlet to the rotor housing. The valve includes a control portion that communicates with a pressure controller, which measures fluid pressure in the rotor housing downstream of the valve. If the pressure exceeds a predetermined set-point, the pressure controller causes the valve to close. If the pressure drops below a predetermined set-point, the pressure controller causes the valve to open. In this manner, the pressure within the housing can be maintained within a predetermined range for optimal nozzle performance.

In general, pressure regulating valves commonly consist of two basic types depending on the flow rate through the sprinkler housing: high-flow or low-flow valves. For instance, high-flow valves are suitable to maintain desired case pressures with fluid flow up to about 16 gallons per minute or higher. Low-flow valves, on the other hand, are generally suitable to maintain case pressures with fluid flow as low as about 1.3 gallons per minute. For purposes of this application, high flow and low flow can mean any range of flow rates. The valves can be designed with a sealing poppet connected to a piston, and an outlet orifice suitable for its optimum flow range to achieve the desired downstream pressures. In many cases, the piston utilizes a flat gasket in order to more efficiently seal the piston against the valve seat when the valve is closed.

Unfortunately, pressure regulating valves are generally not robust enough to be useful outside of their designed pressure and flow set points. For instance, the orifice size of the low flow valve is generally too small for effective use in an irrigation sprinkler device optimized for high flow rates because the small orifice size would cause a very large pressure drop across the valve so the case pressure would be undesirably too low for effective outlet nozzle performance.

On the other hand, the high flow valve has a larger inlet orifice reducing the pressure drop across the valve, but at low flow rates, the valve exhibits an undesired behavior where the valve is constantly opening and closing because the downstream pressure can not be maintained. For instance, a decrease in flow rate results in a corresponding decrease in the pressure drop across the valve. As a result, when the flow rate is sufficiently low, the pressure drop across the valve is decreased such that the case pressure downstream of the valve is above the desired set-point; therefore, the valve closes. As the case pressure again drops to below the desired set-point range, the valve again opens and sufficient flow at a low pressure drop rushes past the valve so that the desired case pressure is again quickly exceeded. The cycle is then repeated. Such repeated opening and closing of the valve is a behavior commonly known as "hunting." This undesired behavior results in poor nozzle performance, unnecessary wear on the valve components, and inefficient irrigation.

As described above, to avoid such valve behavior, multiple pressure regulating valves are designed to operate in predetermined pressure and flow ranges. However, multiple valve designs require increased manufacturing costs due to multiple parts, increased tooling, and large inventories. Moreover, once installed in an irrigation system, if the base pressures or flow rates vary beyond the valve's optimum pressure and flow ranges, the valve may fall outside its desired performance range and exhibit the undesired behaviors described above.

Accordingly, an irrigation pressure regulating device is desired that effectively regulates pressure over a wide flow and pressure range without the undesired behaviors of current pressure regulating valves.

DESCRIPTION OF THE PREFERRED EMBODIMENTS

Figure 1:
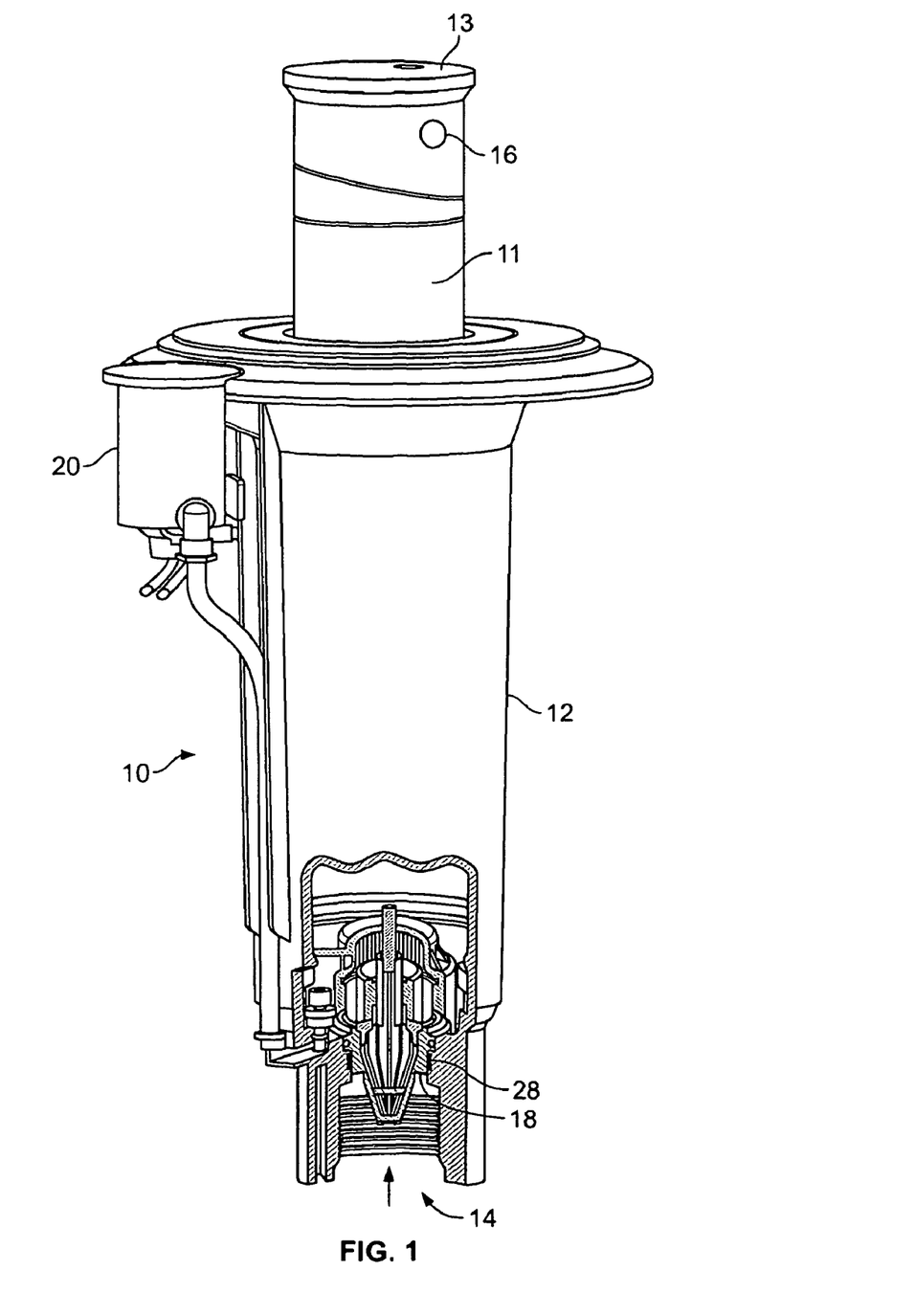
FIG. 1 is a partially cutaway, perspective view of an irrigation sprinkler showing a pressure regulating device therein.

Referring to FIG. 1, there is illustrated an irrigation sprinkler system device in the form of a pop-up rotor sprinkler 10. The sprinkler 10 includes a stationary housing 12 with an inlet 14 configured to connect to a fluid supply line (not shown). The sprinkler 10 further includes a riser 11 that retracts into the housing 12 during operation. The terminal end of the riser 13 includes a nozzle 16 to distribute fluid during operation. The nozzle 16 is rotated by a fluid driven rotor (not shown) to distribute fluid from the sprinkler 10 via the nozzle 16.

A pressure regulating valve 18 is disposed in the housing 12 to compensate for changes in the flow rates and pressure of the fluid from the supply line. Appropriate regulation is desired to maintain a consistent discharge of fluid from the nozzle 16. The valve includes an improved gasket to accommodate an enhanced range of fluid flow rates and to prevent the valve from opening and closing undesirably at low flow rates (i.e., "hunting"). The preferred valve 18 can regulate flow rates in the range of about 1.3 to about 16 gallons per minute. Although the valve 18 is described herein with a rotor sprinkler, it can be used with other irrigation devices where pressure control is desired, such as, for example, impact sprinklers, spray heads, drip irrigation devices, valves, etc.

The sprinkler 10 also preferably includes a pressure controller 20 that monitors the fluid pressure inside the housing 12 downstream from the pressure regulating valve 18. When the fluid pressure exceeds a predetermined set point, the pressure controller 20 causes the pressure regulating valve 18 to close. Once the fluid pressure inside the housing 12 is below a predetermined set-point, the pressure controller 20 causes the pressure regulating valve 18 to open. In this manner, the fluid pressure within the housing 12 is generally maintained within a desired range. As illustrated, the preferred pressure controller 20 is partially external to the housing 12 and includes a user adjustable dial (not shown) so that the desired pressure range can be varied in the field as needed to provide the appropriate irrigation.

Figure 2:
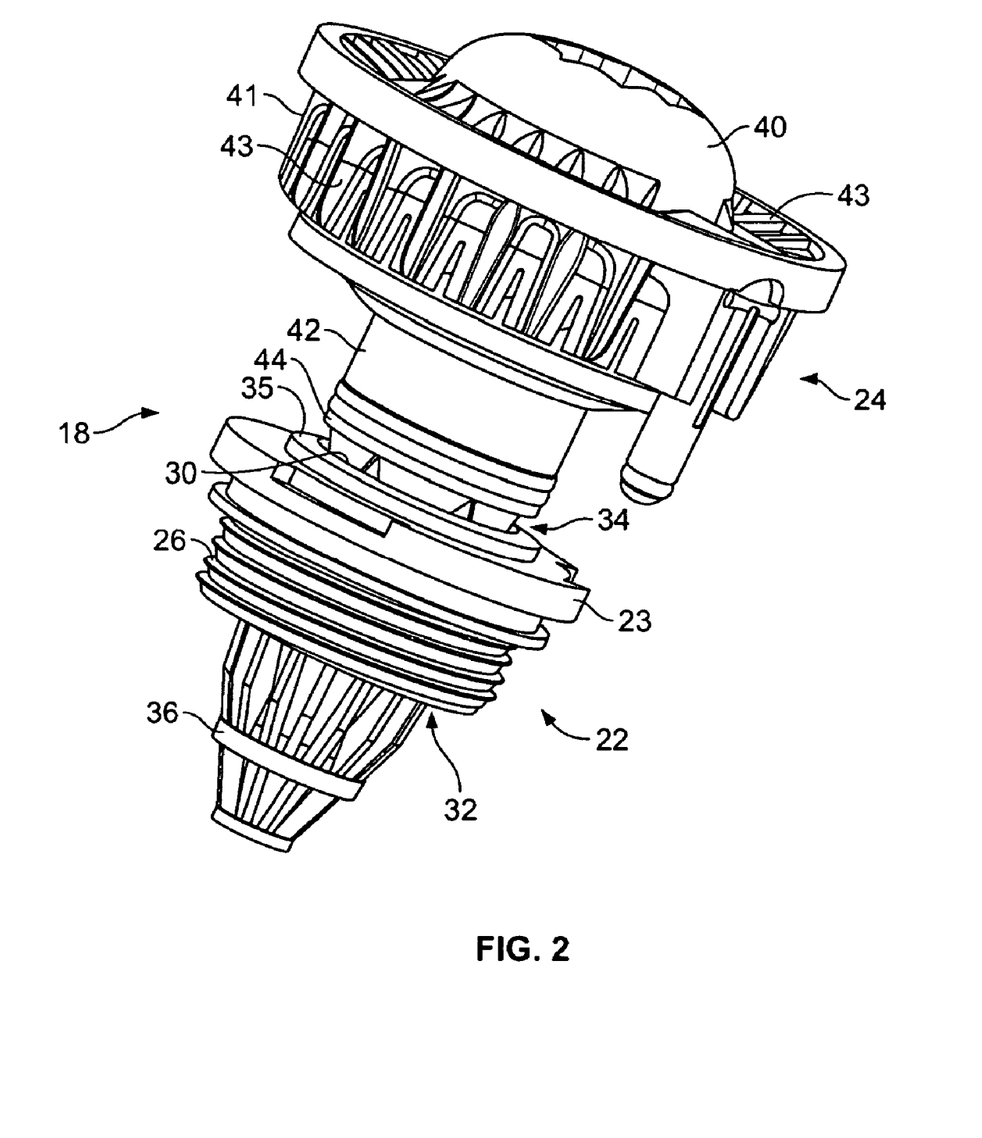
FIG. 2 is a perspective view of the pressure regulating device of FIG. 1, the device being shown in a partially open condition.

Referring to FIG. 2, the pressure regulating valve 18 includes a lower base portion 22 and an upper control portion 24. The flow portion 22 includes a body 23 having external threads 26 so that it may be threadedly received in the housing inlet 14, which preferably has complementary inner threads 28. The body 23 defines a central passageway or bore 30 extending between an inlet 32 and a valve outlet 34. The passageway 30 further includes an upper edge at the valve outlet 34 defining a valve seat 35. Depending below the inlet 32 is an optional rock screen 36, which is attached at the inlet 32 and extends upstream to prevent foreign debris from flowing into the sprinkler 10.

The control portion 24 includes a bonnet 40 and an axially aligned piston 42 configured to engage the valve seat 35. In response to the pressure controller 20, the bonnet 40 controls movement of the piston 42 to open and close the valve outlet 34 in order to achieve the desired pressure within the housing 12. That is, the valve 18 is closed when the bonnet 40 lowers the piston 42 to engage the valve seat 35. The valve 18 is open when the piston 42 is withdrawn from the bore 30.

For instance, the pressure controller 20 is in fluid communication with the fluid downstream of the valve 18. A biased member (not shown) within the pressure controller 20 moves when the housing pressure exceeds a predetermined range (i.e., the fluid pressure exceeds the forces provided by the biased member) to permit the fluid to flow through the pressure controller 20 into the bonnet 40 wherein the fluid pressure closes the valve 18. When the pressure in the housing 12 drops below a predetermined range, the biased member closes, and the fluid pressure in the sprinkler inlet 14 opens the valve 18. The user adjustable dial changes the biasing force provided by the biased member to change the pressure range the valve 18 opens and closes.

Preferably, the bonnet 40 also has an outer surface 41 forming a manifold to distribute the fluid exiting the valve outlet 34 into the upper housing 12. The manifold preferably is formed from a plurality of fins 43 that also engage a lock member disposed on the internal housing walls to secure the bonnet 40 thereto.

A lower end of the piston 42 is filled with a gasket 44. As further described below, the gasket 44 permits the valve 18 to control the fluid pressure in the housing 12 and riser 11 over a wide range of fluid flow rates. Accordingly, the valve 18 provides a single device that accommodates low flow rates (i.e., as low as about 1.3 gallons per minute) and high flow rates (i.e., up to about 16 gallons per minute or higher) whereas previously two or more devices were required for such range to achieve desired housing pressures without exhibiting the undesired hunting behavior.

Figure 3:
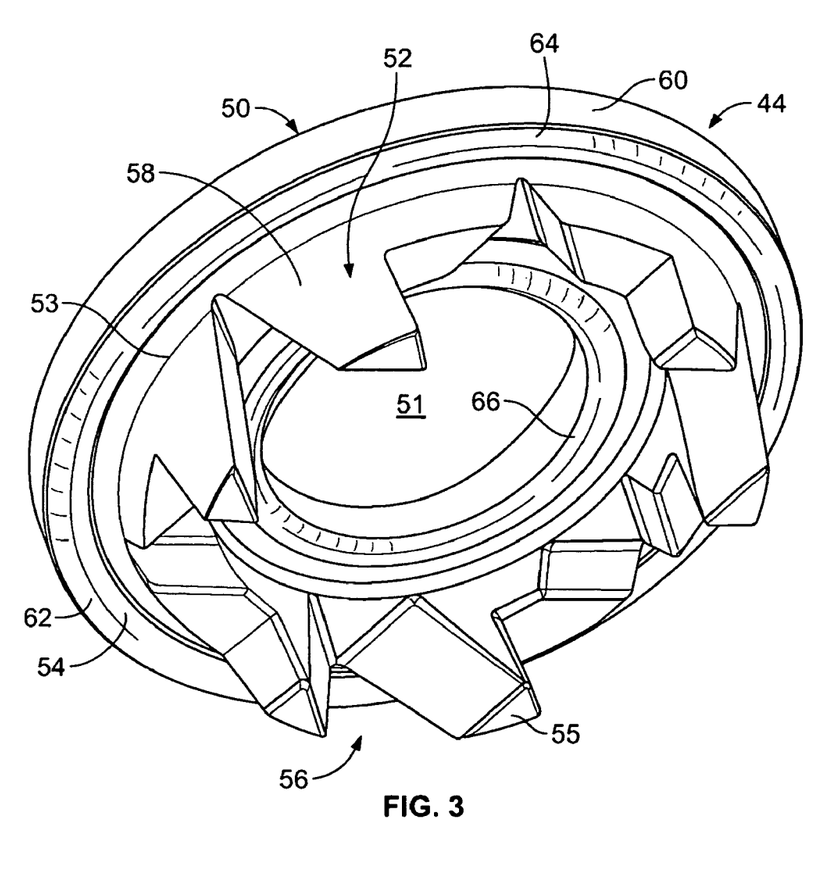
FIG. 3 is a perspective view of a first gasket embodiment configured for use in the pressure regulating device of FIG. 2.

Referring to FIG. 3, the gasket 44 is preferably constructed from a flexible material, such as a nitrile or an EPDM. The gasket 44 includes an annular, washer-like base portion 50 and an annular, toothed flow-control portion 52, which depends from a lower surface 54 of the base portion 50. The base portion 50 defines a centrally located aperture 51, and the flow-control portion 52 generally surrounds the aperture 51. The flow-control portion 52 is preferably tapered inwardly such that the upper transition 53 with the base member 50 has a larger diameter than a lower, terminal edge 55. Other sizes and shapes of the base portion 50 and the flow-control portion 52 may also be appropriate depending on the particular pressure regulating operation to be performed. For instance, for larger scale devices, the gasket may be scaled upward as well.

The flow-control portion 52 is received within the valve bore 30 and includes an outer surface 58 configured to engage an inner surface 31 of the valve bore 30 in a complementary fashion, as best illustrated in FIGS. 2 and 8A-8C. The flow-control portion 52 also is radially spaced inwardly from a peripheral edge 60 of the base portion 50 to form an annular seating surface 62 on the base portion lower surface 54 between the peripheral edge 60 and the upper transition 53 of the flow-control portion 52. The seating surface 62 is configured to engage the valve seat 35 when the valve 18 is in a closed condition. Accordingly, the gasket 44 forms a substantially fluid tight seal with the valve seat 35 to prevent fluid flow through the valve. To improve sealing, the seating surface 62 may also include an annular rib or bead 64 on the seating surface 62 to reduce the potential for fluid bleeding or weeping when the valve is closed.

The preferred gasket 44 is joined to the valve 18 by a valve nut (not shown) extending through the aperture 51 into the stem 42. The gasket 44 may be joined to the valve 18 in any other manner known in the art. The lower surface 54 of the base member 50 may also include a second annular rib or bead 66 surrounding the aperture 51. The second rib 66 preferably would be disposed on the lower surface 54 of the base member 50 internally of the flow-control portion 52 to prevent fluid bleeding or weeping through the aperture 51 and the valve nut.

Referring to FIGS. 3 and 5-7, the flow-control portion 52 preferably includes a plurality of fluid passages 56 of various sizes and shapes. With the valve 18 in an open condition, the fluid flows through the fluid passages 56 rather than around the lower edge 55 of the gasket 44 because at least a portion of the outer surface 58 of the flow-control portion 52 always remains in contact with the bore inner surface 31. As will be further described below, the flow control portion 52 of the gasket 44 provides improved control of the fluid pressure in the housing 12 and riser 11 and reduces valve "hunting." This effect is achieved even with a flow rate as low as about 1.3 gallons per minute through a pressure regulating device having an inlet opening of about 1 inch or larger.

Figure 5:
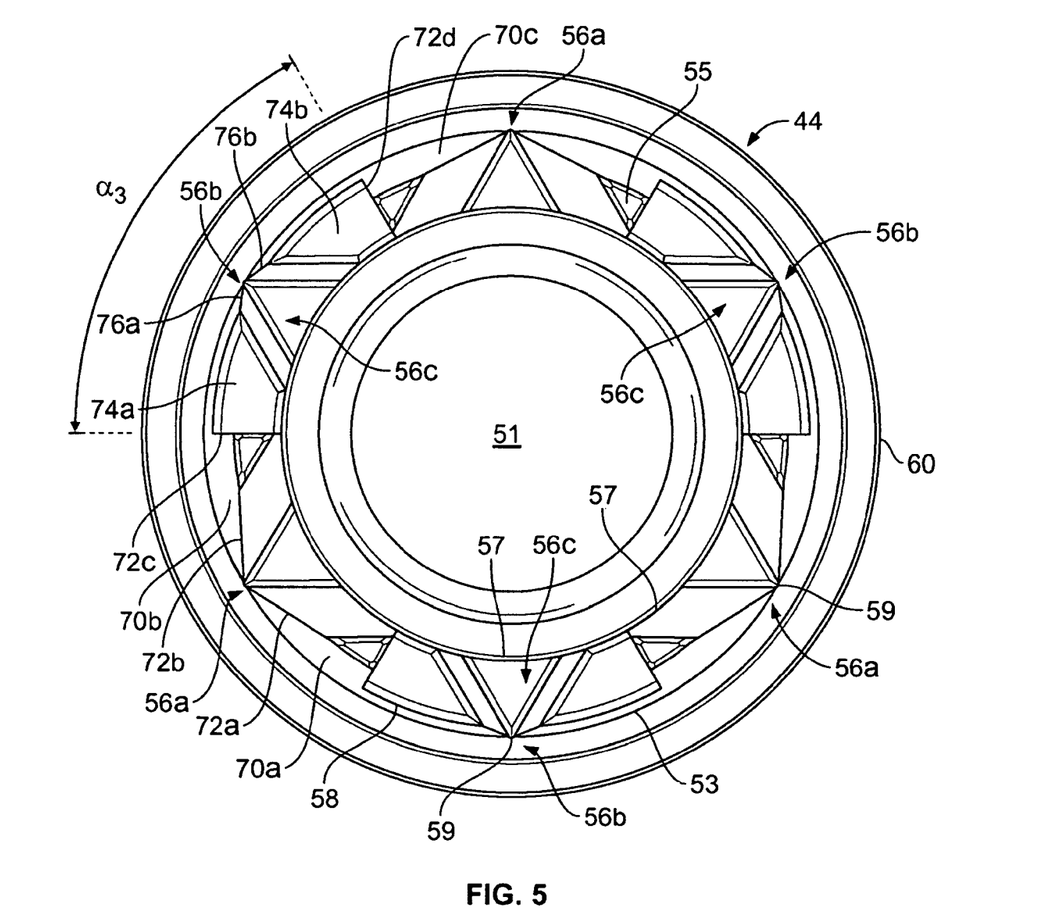
FIG. 5 is a plan view of the gasket of FIG. 3.
Figure 6:
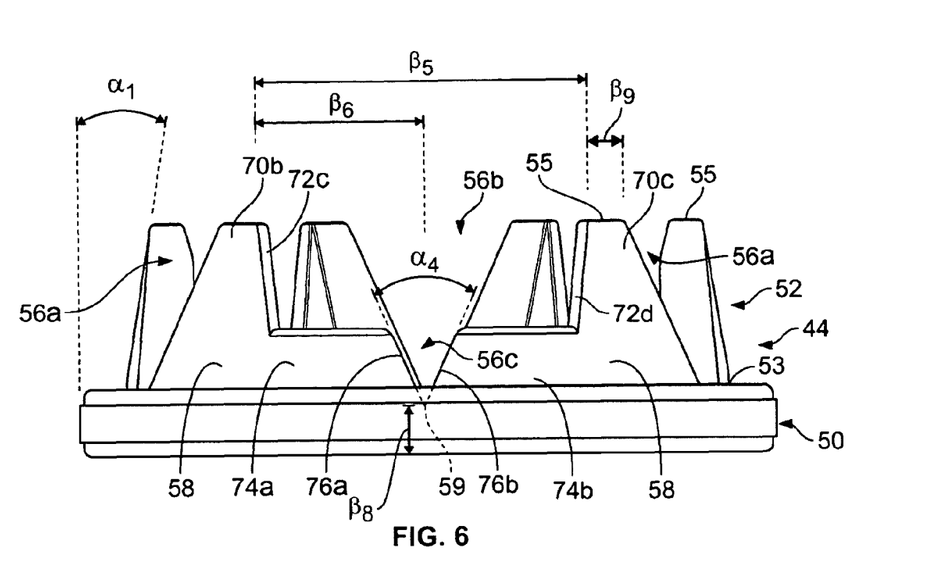
FIG. 6 is an elevational view of the gasket of FIG. 3.
Figure 7:
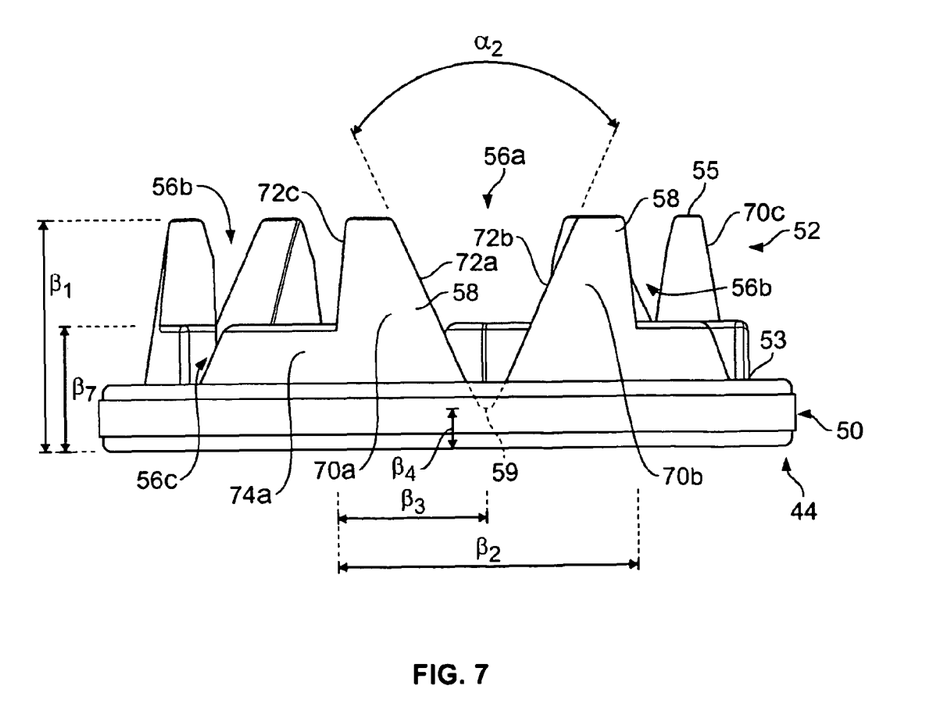
FIG. 7 is another elevational view of the gasket of FIG. 3 rotated about 45 degrees from the view of FIG. 6.

The preferred fluid passages 56 include two alternating fluid passages 56a and 56b of different sizes and shapes. As best illustrated in FIGS. 5-7, the fluid passage 56a preferably has a generally V-shaped opening bounded by a pair of generally pyramidal-shaped fingers 70a and 70b. The fingers 70a and 70b have facing inner edges 72a and 72b that taper away from each other to define the generally V-shaped passage 56a within the flow control portion 52. In addition, the passage 56a also narrows radially as it extends outward of the flow-control portion 52. More specifically, as best illustrated in FIG. 7, the passage 56a narrows as it extends radially from an inner edge 57 to an outer edge 59 of the flow control portion 52. The narrowing of the passage 56a generally provides a greater pressure drop through the valve 18 as the fluid is forced through the more narrow portions of the passage 56a.

As illustrated in FIGS. 5-7, the fluid passage 56b preferably has a generally arcuate rectangular-shaped opening in the gasket flow-control portion 52. The fluid passage 56b is bounded by the generally pyramidal-shaped finger 70b and a third pyramidal-shaped finger 70c. The facing inner edges 72c and 72d of the fingers 70b and 70c are generally parallel and not tapered so as to form the generally arcuate rectangular-shaped passage 56b. Additionally, as illustrated in the plan view of FIG. 7, the passage 56b, because of its arcuate shape, also preferably has an increasing width as it extends radially outward. As a result of its generally arcuate, rectangular-shape, the fluid passage 56b also has a larger opening area than the arcuate V-shaped fluid passage 56a and permits a larger amount of fluid flow therethrough with a relatively smaller pressure drop.

To further increase the opening area, the fluid passage 56b may also include a secondary fluid passage 56c, which is an extension of an upper edge of the generally arcuate rectangular-shaped fluid passage 56b. In one instance, the secondary fluid passage 56c is defined by a pair of smaller trapezoidal-shaped fingers 74a and 74b, which extend inwardly from the inner finger edges 72c and 72d. As illustrated in FIGS. 5-7, the secondary fluid passage 56c also preferably has a generally arcuate V-shaped opening in the flow-control portion 52 at the upper edge of the fluid passage 56b. The generally arcuate V-shape of the secondary fluid passage 56c is defined by facing inner edges 76a and 76b of the smaller trapezoidal-shaped fingers 74a and 74b that taper away from each other to form the generally V-shape of the passage 56c.

Similar to the passage 56a, the secondary fluid passage 56c also narrows as it extends through the flow control portion 52. As seen in the plan view of FIG. 7, the passage 56c is wider at the flow control portion inner edge 57 compared to the flow control portion outer edge 59. Such narrowing of passage 56c also generally increases the pressure drop therethrough.

Most preferably, as illustrated in FIG. 7, the gasket 44 includes three of the generally arcuate V-shaped fluid passages 56a and three of the generally arcuate rectangular-shaped passages 56b with the secondary passage 56c. Each of the passages 56a and 56b preferably alternate about the flow-control portion 52. However, the passages 56a and 56b may be in any order or pattern within the flow-control portion 52. Preferably, the passages 56 are positioned about 120 degrees from one another so that they do not provide any side-loading on the gasket/piston assembly. This positioning allows similar fluid flows and forces throughout each passage 56 that counteract each other. The other fluid passages 56a, 56b, or 56c are defined by similar fingers and edges in the flow-control portion 52 as described above.

The gasket 44 forms the valve outlet 34. As a result, the valve outlet 34 has a variable opening area depending on the movement of the gasket 44 due to the fluid passages 56a, 56b, and 56c. That is, when the valve 18 is open a first amount as the gasket 44 is moved longitudinally away from the valve seat 35 by the valve control portion 24, the cooperation of the bore 30 and fluid passages 56 define a valve outlet 34 with a first opening area. When the valve 18 is open to a second amount as the gasket 44 is moved longitudinally further away from the body 23, the cooperation of the bore 30 and the fluid passages 56 define a valve outlet 34 with a second, greater opening area.

The pressure regulating valve 18 and the gasket 44 also form the outlet 34 with a reduced and variable opening area over a typical pressure regulating valve with a traditional flat gasket because of the gasket flow control portion 52 being received in the valve bore 30 and the fluid passages 56 therein. However, because of the generally V-shaped passages 56a, the valve 18 with the gasket 44 also includes an increasingly larger outlet 34 area as the valve 18 is opened. As a result, the valve 18 provides an optimized pressure drop with reduced or eliminated valve hunting over a wide flow rate range not possible with traditional pressure regulating valve.

For example, a standard pressure regulating valve having a traditional flat gasket will exhibit hunting behavior between 3 to 12 gallons per minute as shown in Table 1 below. As a result, depending on the desired housing pressure and flow rate, the standard valve and traditional flat gasket are limited in the range of flow that the valve can accommodate effectively. As shown in Table 1, with a pressure drop of 20 psi (i.e., 120 psi supply pressure and 100 psi housing/riser pressure), the typical valve with a traditional gasket cannot operate below 3 gallons per minute because hunting occurs.

TABLE 1

Hunting Behavior of Current Pressure Regulating Valves

| Supply Pressure, psi | Housing/Riser Pressure, psi | Lowest Flow Rate Before Hunting, gpm |
|---|---|---|
| 120 | 100 | 3 |
| 120 | 80 | 7.5 |
| 120 | 60 | 12 |

On the other hand, the exact same valve incorporating the gasket 44 having the flow portion 52 with fluid passages 56, as described and illustrated with FIGS. 5-7, did not exhibit hunting even with flow rates as low as 1.3 gallons per minute. Table 2 provides data of the observations. The gasket 44 enables the valve to operate over a wider range of flow rates.

TABLE 2

Non-Hunting Behavior of Inventive Pressure Regulating Device

| Supply Pressure, psi | Housing/Riser Pressure, psi | Lowest Flow Rate Tested, gpm | Comments |
|---|---|---|---|
| 120 | 60 | 1.3 | No Hunting Observed |
| 120 | 40 | 1.3 | No Hunting Observed |

In one valve/gasket combination, the gasket 44 permits a valve 18 with a large bore (i.e., about 1 inch or greater) to regulate pressure for a low flow rate (i.e., about 1.3 to about 1.5 gallons per minute) without valve "hunting" by decreasing the area of the valve outlet 34 relative to the bore 30 to create a larger pressure drop. At the same time, the gasket 44 can also regulate fluid pressure at high flow rates (i.e., about 16 gallons per minute or higher) by having an increasing larger valve outlet 34 relative to the bore 30 as the valve opens further to create smaller pressure drops.

For instance, at low flow rates, the gasket 44 provides a slower transition from the closed condition to the open condition as the gasket 44 rises out of the bore 30 a first amount. Because of the passages 56, the area of the valve outlet 34 increases at a metered amount as the gasket 44 rises out of the bore 30 until the proper downstream pressure regulation is achieved. In this manner, a large pressure drop is created at low flow rates through a small valve outlet 34 relative to the bore 30 because, as the valve 18 is opened a first amount, only a small outlet area 34 is formed via the passages 56c and the upper portions of passages 56a. As the valve 18 is opened farther, an increasing larger outlet opening 34 is exposed relative to the bore 30 providing a metered pressure drop across the valve until the desired operating pressure is obtained.

In this manner, at low flow rates, the valve 18 can remain open a first amount to achieve the desired housing pressure rather than repeatedly opening and closing as exhibited by prior pressure regulating valves. It would be difficult for existing valves with large bores (i.e., about 1 inch or greater) to only open a small amount to achieve similar pressure drops at low flow rates (i.e., about 1.3 to about 1.5 gallons per minute) because flow and pressure changes will easily cause the valve to close. Moreover, existing valves typically open too quickly for a small outlet area and large pressure drop to be maintained before the housing pressure exceeds the desire range; thereby, causing the valve to close and begin the undesired hunting cycle. The gasket 44, on the other hand, permits the valve 18, which is originally designed for high flow rates, to slowly open a first amount at a metered rate, yet still achieve and maintain large pressure drops across the valve at low flow rates.

At high flow rates, on the other hand, the gasket 44 also provides an increasing larger valve outlet 34 relative to the bore 30. For instance, when the valve 18 is open a second, larger amount, an increased outlet opening 34 is formed via the passages 56a and the passages 56b being exposed together. The gasket 44, now with a larger outlet opening 34 relative to the bore 30, also creates a smaller pressure drop across the same valve 18.

Accordingly, the gasket 44 optimizes the area of the outlet openings 34 relative to the valve bore 30 in order to achieve the desired fluid pressure for both high and low flow rates in a valve that is originally designed only for high flow rates. The single valve 18, therefore, can be used with a wider flow and pressure drop range, which minimizes the parts inventory needed for an irrigation system and permits variations in fluid conditions to have a minimal effect on the system's performance.

Figure 8A:
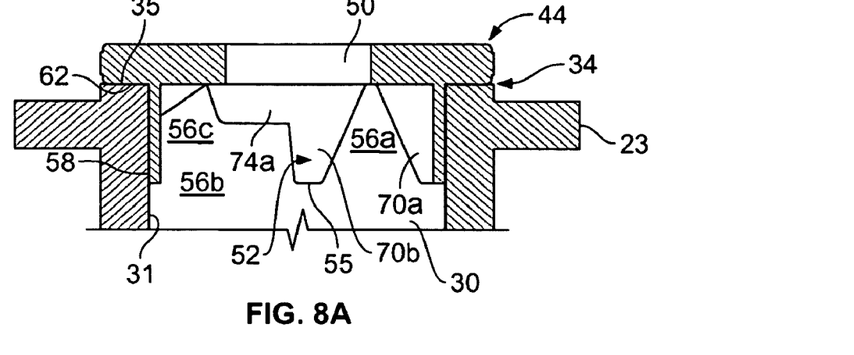
FIG. 8A is a cross-sectional view of the pressure regulating valve of FIG. 2 shown closed.
Figure 8B:
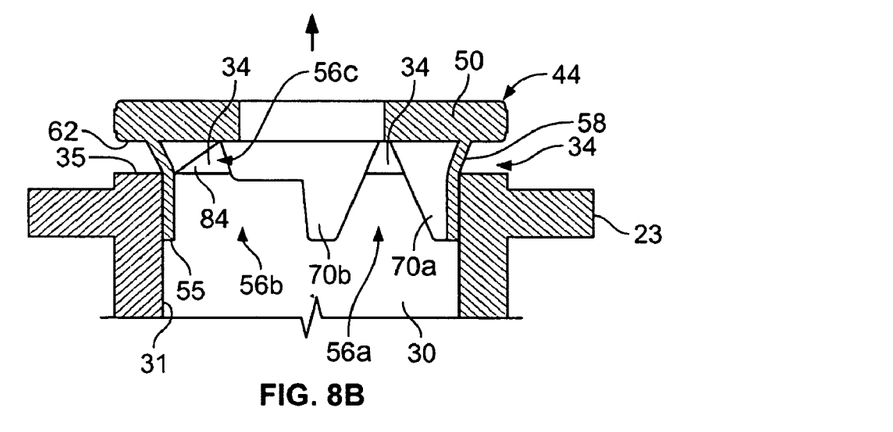
FIG. 8B is a cross-sectional view of the pressure regulating valve of FIG. 2 shown open a first degree.
Figure 8C:
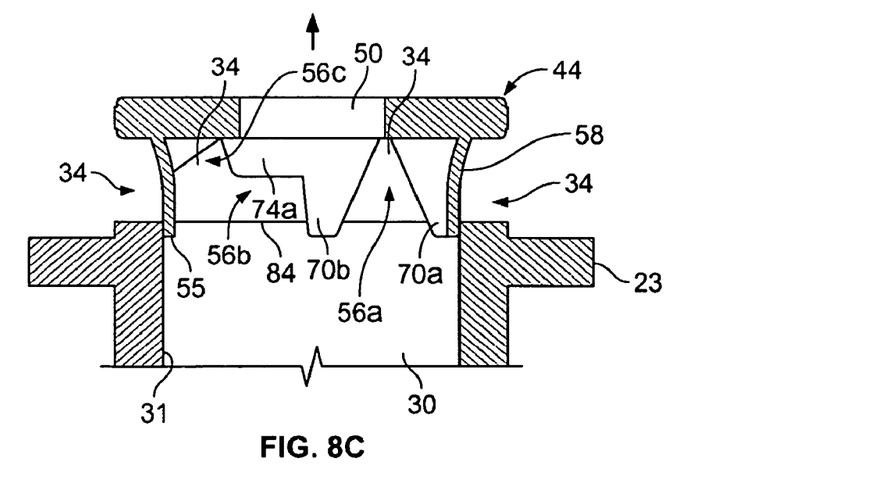
FIG. 8C is a cross-sectional view of the pressure regulating valve of FIG. 2 shown open a second degree.
Figure 8D:
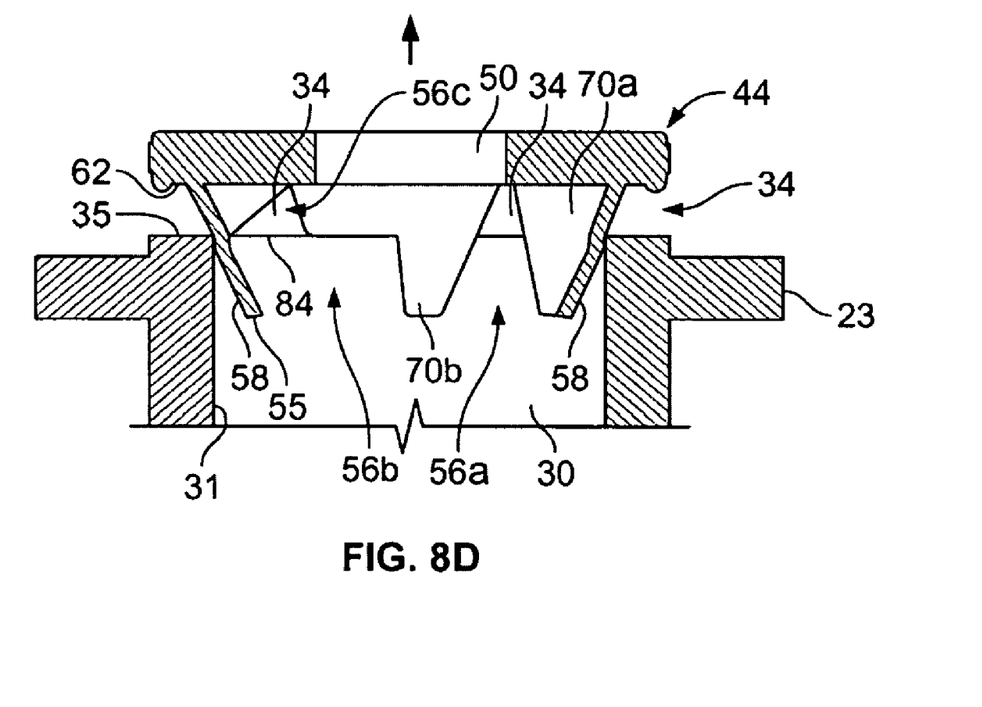
FIG. 8D is an alternate cross-sectional view of the pressure regulating valve of FIG. 2.

Referring to FIGS. 8A-8C, the operation of the preferred valve 18 having the gasket 44 is illustrated. FIG. 8A illustrates the valve 18 in a closed, sealed condition. FIG. 8B illustrates the valve 18 partially open a first amount. FIG. 8C illustrates the valve 18 open a second, greater amount. The discussion that follows describes the valve 18 moving from a closed to an open condition; as one skilled in the art will appreciate, the valve 18 will also function from an open to a closed condition in a similar but reversed manner. While FIGS. 8A-8C show the valve 18 with one configuration of the gasket outer surface 58 engaging the bore inner surface 31, FIG. 8D shows an alternate engagement between outer surface 58 and the bore inner surface 31.

In the closed condition, shown in FIG. 8A, the fluid is prevented from flowing through the bore 30 because the gasket seating surface 62 has engaged the valve seat 35 to close the valve outlet 34. In this condition, the gasket flow-control portion 52 is fully received within the bore 30, and portions of the outer surfaces 58 of fingers 70a, 70b, and 70c, as well as portions of the outer surfaces 58 of smaller fingers 74a and 74b, contact the inner surface 31 of the bore 30 in a sealing engagement.

When the pressure controller 20 senses the fluid pressure dropping within the housing/riser 12, it signals the valve 18 to open. FIG. 8B illustrates the valve open a first amount. In this condition, the outer surfaces 58 of all fingers (70a, 70b, 70c, 74a, and 74b) still contact the bore inner surface 31. At this point, the valve outlet 34 has a first size, shape, and cross-sectional area defined by the cooperation between the fluid passages 56 (i.e., the fluid passages 56a and 56c) with the valve seat 35 of the valve bore 30. In this manner, the fluid is forced through the fluid passages 56 rather than around the lower edge 55 of the gasket 44.

When the valve 18 is open in this first condition, the valve 18 has a reduced outlet 34 size that includes only the upper portions of the arcuate V-shaped openings 56a and 56c. These smaller portions of fluid passage 56 permit a sufficient pressure drop across the valve in order to maintain the desired housing 12 and riser 11 pressure and reduce (and preferably eliminate) hunting behavior for flow rates down to about 1.3 gallons per minute. In one instance, for example, the gasket 44 provided a passage cross-sectional area of about 0.0017 inches with a flow rate of between about 1.3 to about 1.5 gallons per minute to create a pressure drop of about 90 psi.

If the pressure controller senses that the pressure has decreased beyond the desired amount, it will cause the valve 18 to open to a second amount. Accordingly, the gasket 44 is caused to move further away from the valve seat 35, as illustrated in FIG. 8C. In this condition, the valve outlet 34 has a second, larger cross-sectional area that now includes portions of the fluid passages 56a, 56b, and 56c. As illustrated, the outer surfaces 58 of smaller fingers 74a and 74b are no longer engaging the inner bore surface 31, but portions of the outer surfaces 58 of fingers 70a, 70b, and 70c remain in contact with the bore inner surface 31 so that the fluid is still directed through the fluid passages 56. Preferably, at least a portion of the outer surfaces 58 of the fingers 70a, 70b, and 70c will always remain engaged with the bore inner surface 31 with the valve 18 in a fully open condition. In this manner, the fluid will always be directed through the fluid passages 56 rather than around the lower, terminal gasket edge 55.

When open to the second amount, the device outlet 34 incorporates the increased size of all three fluid passages 56a, 56b, and 56c. Therefore, as previously discussed, the valve 18 now has an outlet 34 with a sufficient area to allow increased flow with a lower pressure drop to achieve the desired housing pressure for high flow conditions, such as up to 16 gallons per minute with a 10 to 15 psi pressure drop. While FIGS. 8A-8C depict the valve 18 being closed and open first and second amounts, it will be appreciated that the valve 18 may also be open many different levels between the closed and open positions depending on the pressure, flow rates, and valve size.

While the gasket 44 is illustrated with a fluid passage 56 having a plurality of generally V-shaped and generally rectangular-shaped passages, any number, size, and shape passages would be expected to perform in a similar fashion (as long as it provides the desired area of opening per flow rate).

Referring again to FIGS. 5-7, a most preferred embodiment of the gasket 44 will be described in more detail. Such gasket 44 has an outer diameter at the perimeter 60 of about 1.13 inches and an inner diameter of the aperture 51 of about 0.5 inches. It has a flow control portion 52 with a height $\beta 1$ of about 0.36 inches and an outer diameter at upper transition 53 of about 0.96 inches. In order to maintain the flush engagement with the bore 30, the flow control portion 52 has a taper al of about 10°. Furthermore, each of the fingers 70a, 70b, and 70c has an arcuate width $\beta 9$ at the lower edge 55 of about 0.08 inches The passage 56a of the most preferred gasket 44 generally forms a V-shaped passage through the flow control portion 52 via edges 72a and 72b. More specifically, the V-shape forms an angle $\alpha 2$ of about 30 degrees and spans an arcuate length $\beta 2$ of about 0.5 inches. In other words, the passage 56a also forms a distance $\beta 3$ from the upper intersection 59 of V-edges 72a and 72b to the finger edge 72c of about 0.25 inches. The upper intersection 59 of passage 56a also has a height $\beta 4$ of about 0.08 inches.

Passage 56b of the most preferred gasket 44, on the other hand, has a generally rectangular shape and spans an angle $\alpha 3$ between rectangular-edges 72c and 72d of about 60 degrees and has an arcuate length β5 of about 0.5 inches. In other words, the arcuate distance β6 from rectangular-edge 72c to V-intersection 59 is about 0.25 inches.

Passage 56c of the most preferred gasket 44 also forms a generally V-shape in the flow control portion 52 via V-edges 76a and 76b, which form an angle α4 of about 30 degrees. The smaller fingers 74a have a height β7 of about 0.18 inches and the upper intersection point 59 of passage 56c forms a height β8 of about 0.08 inches.

While the most preferred embodiment of the gasket 44 is described above using specific dimensions, it will be appreciated that other dimensions, angles, and shapes are also acceptable so long as the gasket provides the desired pressure control over a wide flow rate and pressure range without valve hunting.

Figure 4:
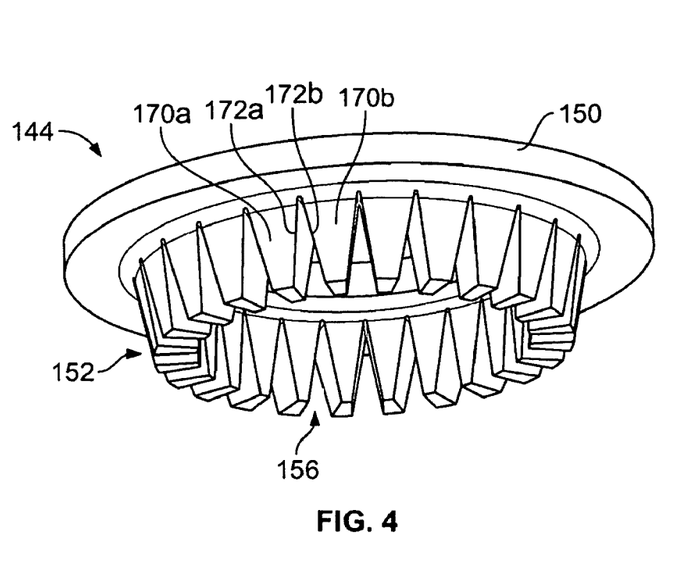
FIG. 4 is a perspective view of a second gasket embodiment configured for use in the pressure regulating device of FIG. 2.

Referring to FIG. 4, there is illustrated an alternate gasket 144 for use in the valve 18. Because the gasket 144 is similar to gasket 44, only the differences between the gaskets will be described in detail below.

For instance, the gasket 144 includes a base portion 150 and a flow-control portion 152 depending therefrom, but includes passages 156 with a plurality of generally arcuate V-shaped passages 156. That is, the generally arcuate V-shaped fluid passages 156 are each bounded by a pair of fingers 170a and 170b that each include facing inner edges 172a and 172b that taper away from each other to form the generally V-shaped fluid passage 156. With the gasket 144, an outer surface 158 of the fingers 170a and 170b preferably engages the inner bore surface 31 at all times.

It will be understood that various changes in the details, materials, and arrangements of parts and components which have been herein described and illustrated in order to explain the nature of the invention may be made by those skilled in the art within the principle and scope of the invention as expressed in the appended claims.

What is claimed is:

1. An irrigation sprinkler pressure regulating valve comprising:
   a valve body defining a bore with an inner surface and an edge portion of the bore defining a valve seat;
   a biasing member for controlling the pressure regulating valve;
   a valve piston coupled to the biasing member and configured to move between at least a first position and a second position, the valve piston including:
      a seating surface mounted for movement with the valve piston and arranged to engage the valve seat when the valve piston is in the first position and to be spaced from the valve seat when the valve piston is in the second position;
      a flow-control portion having an outer surface and extending from the seating surface and arranged for movement therewith, the flow-control portion received in the valve bore upstream of the valve seat;
      at least one gap extending generally radially through the flow control portion and generally transverse to the movement of the valve piston, the at least one gap defined by walls of the flow-control portion that are inclined toward each other in a radial direction generally transverse to and generally parallel to the movement of the valve piston so that the at least one gap narrows as the gap extends radially outward;
      at least a portion of the outer surface of the flow-control portion contacting the inner surface of the bore upstream of the valve seat in both the first and second positions of the valve piston during normal operation thereof; and
   a valve outlet defined by a portion of the valve bore and a portion of the at least one gap, the valve outlet having a variable flow area based on the movement of the valve piston between the first and second positions.

2. An irrigation sprinkler comprising:
   a housing configured for a fluid flow therethrough;
   a pressure regulating valve defining a valve seat, a bore extending upstream of the valve seat and having an inner surface;
   a valve piston movable relative to the valve seat and having a gasket mounted thereon, the gasket defining a base and a flow-control portion;
   the gasket flow-control portion having a plurality of fingers depending from the base, each of the plurality of fingers having at least in part an outer surface bounded by side edges;
   at least one V-shaped gap extending through the flow-control portion of the gasket and bounded by opposing side edges on adjacent fingers and extending between the opposing side edges of the adjacent fingers;
   the fingers of the flow control portion mounted for movement with the valve piston during normal operation thereof and at least a portion of the fingers outer surface engaging the bore inner surface with the valve piston in an open condition such that the fluid flows through a valve outlet defined by cooperation of the at least one V-shaped gap with a portion of the valve seat; and
   the valve outlet having a variable area based on movement of the gasket relative to the valve seat, the at least one V-shaped gap providing an increasing larger area of the valve outlet as the valve piston moves away from the valve seat;
   wherein the gasket base defines a seating surface to engage the valve seat when the valve is in a closed condition; and
   wherein the gasket base is an annular washer and the seating surface includes an annular rib arranged to engage the valve seat.

3. The irrigation sprinkler of claim 2, wherein the flow control portion defines a plurality of gaps that cooperate with the bore to form a plurality of separate fluid passages that combined form the outlet.

4. The irrigation sprinkler of claim 3, wherein the fluid passages comprises a plurality of generally V-shaped passages.

5. The irrigation sprinkler of claim 3, wherein the fluid passage comprises a plurality of generally rectangular-shaped passages.

6. The irrigation sprinkler of claim 3, wherein the fluid passage comprises a plurality of generally V-shaped passages and a plurality of generally rectangular-shaped passages.

7. The irrigation sprinkler of claim 6, wherein the generally V-shaped passages and the generally rectangular-shaped passages alternate along the gasket flow-control portion.

8. The irrigation sprinkler of claim 2, wherein the flow-control portion includes an annular wall extending from the gasket base and defining the fingers and at least one gap thereon, the fingers of the annular wall tapered inwardly toward each other such that a diameter of the flow control portion at the gasket base is larger than a diameter at an end of the annular wall.

* * * * *